United States Patent
Rathgeb

(10) Patent No.: US 10,974,681 B2
(45) Date of Patent: Apr. 13, 2021

(54) VEHICLE OCCUPANT RESTRAINT SYSTEM

(71) Applicant: TB Deu Abwicklungs-Aktiengesellschaft, Aschaffenburg (DE)

(72) Inventor: Volker Rathgeb, Ehingen-Risstissen (DE)

(73) Assignee: Joyson Safety Systems Germany GMBH, Aschafenburg (DE)

( * ) Notice: Subject to any disclaimer, the term of this patent is extended or adjusted under 35 U.S.C. 154(b) by 46 days.

(21) Appl. No.: 16/274,902

(22) Filed: Feb. 13, 2019

(65) Prior Publication Data
US 2019/0256038 A1 Aug. 22, 2019

(30) Foreign Application Priority Data
Feb. 16, 2018 (DE) ...................... 10 2018 202 417.0

(51) Int. Cl.
*B60R 21/231* (2011.01)
*B60R 21/233* (2006.01)
(52) U.S. Cl.
CPC ...... *B60R 21/23138* (2013.01); *B60R 21/233* (2013.01); *B60R 2021/23146* (2013.01);
(Continued)

(58) Field of Classification Search
CPC ............ B60R 21/207; B60R 21/23138; B60R 2021/23146; B60R 2021/23324
See application file for complete search history.

(56) References Cited

U.S. PATENT DOCUMENTS

| 8,783,712 B2 | 7/2014 | Fukushima et al. |
| 2006/0131847 A1 | 6/2006 | Sato et al. |

(Continued)

FOREIGN PATENT DOCUMENTS

| DE | 10106238 A1 * | 9/2002 | ........... B60R 21/207 |
| DE | 10 2005 046 267 A1 | 8/2007 | |

(Continued)

OTHER PUBLICATIONS

Sandwall et al., Lateral gasbag for vehicle, has sleeve, enclosing main gas chamber with impact surface, May 8, 2008, EPO, DE 10 2006 051 553 A1, Machine Translation of Description (Year: 2008).*

(Continued)

*Primary Examiner* — James A English
(74) *Attorney, Agent, or Firm* — Gordon Rees Scully Mansukhani, LLP

(57) ABSTRACT

It is provided a vehicle occupant restraint system comprising an airbag module and a backrest of a vehicle seat, wherein the airbag module is arranged on the backrest. The airbag module comprises an inflatable gas bag main chamber and an inflatable gas bag secondary chamber, wherein in the inflated condition the gas bag main chamber has a larger volume than the gas bag secondary chamber and wherein the gas bag main chamber and the gas bag secondary chamber are fluidically connected to each other via an overflow opening. The airbag module is arranged at the backrest of the vehicle seat such that in the inflated condition the gas bag secondary chamber is supported at the backrest of the vehicle seat.

16 Claims, 4 Drawing Sheets

(52) U.S. Cl.
CPC .............. *B60R 2021/23308* (2013.01); *B60R 2021/23324* (2013.01)

(56) References Cited

U.S. PATENT DOCUMENTS

| | | |
|---|---|---|
| 2008/0191453 A1 | 8/2008 | Mansson et al. |
| 2009/0014990 A1 | 1/2009 | Loibl et al. |
| 2013/0113193 A1* | 5/2013 | Borjeson ............... B60R 21/231 |
| | | 280/730.2 |
| 2017/0158158 A1 | 6/2017 | Thomas |
| 2017/0174174 A1* | 6/2017 | Ohno .................... B60R 21/235 |
| 2017/0225640 A1* | 8/2017 | Ohno .................... B60R 21/239 |
| 2018/0186326 A1* | 7/2018 | Kobayashi ............ B60R 21/239 |
| 2019/0047504 A1* | 2/2019 | Sugishima ............ B60R 21/207 |
| 2019/0152421 A1* | 5/2019 | Byun .................... B60R 21/207 |

FOREIGN PATENT DOCUMENTS

| | | | |
|---|---|---|---|
| DE | 102006051553 A1 * | 5/2008 | ....... B60R 21/23138 |
| DE | 10 2009 021 635 A1 | 11/2010 | |
| DE | 10 2012 214 220 A1 | 5/2014 | |
| DE | 10 2016 123 291 A1 | 6/2017 | |
| WO | WO 2007/065650 A2 | 6/2007 | |
| WO | WO 2010/133280 A1 | 11/2010 | |

OTHER PUBLICATIONS

Sandwall et al., Lateral gasbag for vehicle, has sleeve, enclosing main gas chamber with impact surface, May 8, 2008, EPO, DE 10 2006 051 553 A1, English Abstract (Year: 2008).*

* cited by examiner

VEHICLE OCCUPANT RESTRAINT SYSTEM

REFERENCE TO RELATED APPLICATION

This application claims priority to German Patent Application No. 10 2018 202 417.0 filed on Feb. 16, 2018, the entirety of which is incorporated by reference herein.

BACKGROUND

This disclosure relates to a vehicle occupant restraint system.

Vehicle occupant restraint systems with an inflatable gas bag arranged on a vehicle seat serve to protect the passenger sitting on the vehicle seat in the case of an accident in which the passenger moves out of his normal seating position. In an accident the gas bag is filled with a gas and forms an air cushion. This air cushion can catch the passenger or his upper body and hence slow down the movement of the passenger.

Depending on the shape of the gas bag and the velocity of the passenger, the gas bag can break away in the event of an impact of the passenger on the gas bag and thus protect the passenger less efficiently. Therefore, it is desirable that the gas bag is supported well in the event of an impact in order to prevent it from breaking away.

SUMMARY

It is an object underlying the proposed solution to provide vehicle occupant restraint systems with a gas bag arranged on backrest of a vehicle seat, which in the event of an impact of the passenger breaks away as little as possible.

This object is achieved by providing a vehicle occupant restraint system with features as described herein.

Accordingly, there is provided a vehicle occupant restraint system that comprises an airbag module and a backrest of a vehicle seat, wherein the airbag module is arranged on the backrest. The airbag module comprises an inflatable gas bag main chamber and an inflatable gas bag secondary chamber. In the inflated condition, the gas bag main chamber has a larger volume than the gas bag secondary chamber. The gas bag main chamber and the gas bag secondary chamber are fluidically connected to each other via an overflow opening. In particular, the gas bag main chamber serves to catch an occupant.

The vehicle occupant restraint system is characterized in that the airbag module is arranged at the backrest of the vehicle seat such that in the inflated condition the gas bag secondary chamber is supported at the backrest of the vehicle seat.

The gas bag main chamber and the gas bag secondary chamber each can separately be attached to the backrest. The attachment can be effected via a gas generator or by clips on the backrest.

The gas bag main chamber and the gas bag secondary chamber can be formed by an individual inflatable gas bag. The inflatable gas bag can comprise a first and a second material layer, which in the non-inflated condition of the gas bag lie on each other. The two material layers are attached to each other by means of a circumferential seam. The circumferential seam can be a sewn seam or a glued seam. When they are spread out flat and lie on each other, the material layers can have the same size and shape. To form the gas bag main chamber and the gas bag secondary chamber, the first and the second material layer can be turned over by forming a fold so that the gas bag main chamber and the gas bag secondary chamber are formed on either side of the fold and each are formed by a portion of the first material layer and a portion of the second material layer. The overflow opening here is formed in the region of the fold.

Alternatively, the gas bag main chamber and the gas bag secondary chamber can each be formed by an inflatable gas bag, wherein each gas bag comprises one or two gas bag layers. In this case, the gas bag that forms the gas bag main chamber and the gas bag that forms the gas bag secondary chamber can each have an opening, wherein the two openings are fluidically connected to each other. The two openings fluidically connected to each other here form the overflow opening.

The gas bag main chamber and the gas bag secondary chamber can be connected to each other by a connecting means so that in the inflated condition the gas bag main chamber and the gas bag secondary chamber have a defined alignment relative to each other. The connecting means can prevent that the gas bag main chamber and the gas bag secondary chamber are moved/shifted against each other in particular in the event of an impact of the vehicle occupant. As connecting means a catch strap can be provided for example. It is also conceivable that the gas bag main chamber and the gas bag secondary chamber are sewn to each other along a portion of their circumferential edges.

According to one embodiment, the airbag module comprises a gas generator. The gas generator can be arranged in the gas bag main chamber or in the gas bag secondary chamber and/or protrude into the same or be fluidically connected to the same. Preferably, the gas generator is arranged in the gas bag secondary chamber and/or protrudes into the same. Due to the overflow opening, however, one gas generator can be sufficient to fill both the gas bag main chamber and the gas bag secondary chamber with gas in the case of activation. The gas generator can be fixed at the backrest. The attachment of the gas generator to the backrest can also serve the attachment of the gas bag main chamber and/or the gas bag secondary chamber. In particular, it can be provided that the gas generator is inserted or mounted from below (i.e. in a direction towards the upper side of the backrest, which is defined subsequently).

The backrest usually has a front side, a rear side, a left side, a right side and an upper side. The front side of the backrest here is understood to be the side against which a passenger can lean. The rear side is the side opposite the front side and is oriented substantially parallel to the same. When properly mounted in a vehicle, the front side and the rear side of the backrest accordingly extend substantially perpendicularly to the direction of travel of the vehicle. The left side and the right side of the backrest form the narrow sides of the backrest, which extend between the front side and the rear side substantially vertically and perpendicularly to the front side and the rear side. The terms left and right are to be understood with respect to the direction of travel of the vehicle. In case the vehicle seat is a seat for the vehicle operator, the left side hence is the side facing the driver's door and the right side is the side facing the vehicle interior space. The upper side of the backrest forms the narrow side of the backrest, which extends between the front side and the rear side and connects the front and rear sides at their upper ends.

In particular, the airbag module is arranged laterally (left side or right side) at the backrest. Preferably, the airbag module is arranged at the side facing the vehicle interior space and facing away from a vehicle door. Thus, in the event of a side impact of the vehicle the inflated gas bag main chamber for example can hold the driver in the seat and protect the neighboring occupant against a collision.

According to one embodiment, the gas bag main chamber in the inflated condition is supported at the inflated gas bag secondary chamber so that the gas bag secondary chamber is arranged between the gas bag main chamber and the backrest. The effective thickness of the inflated gas bag main chamber thereby is increased in the portion against which the gas bag secondary chamber rests, so that this portion of the gas bag main chamber possibly can be supported at the backrest of an adjacent vehicle seat or on a part of the vehicle body. In this embodiment the gas bag main chamber is supported at the gas bag secondary chamber, not on the gas generator. By the aforementioned connecting means it can be achieved that in the inflated condition the gas bag main chamber and the gas bag secondary chamber are aligned relative to each other such that the gas bag main chamber (sectionally) is supported on the gas bag secondary chamber.

The gas bag secondary chamber can be laterally (left side or right side) supported at the backrest. In addition, the gas bag secondary chamber in particular can be laterally attached to the backrest. The gas bag secondary chamber and the gas bag main chamber correspondingly are arranged on the left or right side of the backrest.

As mentioned already, the attachment of the gas generator to the backrest also can serve the attachment of the gas bag main chamber and/or the gas bag secondary chamber to the backrest. For this purpose, the gas generator can be laterally (left side or right side) attached to the backrest. In case the gas generator is arranged in the gas bag secondary chamber or protrudes into the same, the gas generator preferably is attached to the left or right side of the backrest as far as possible to the rear as seen in the direction of travel. In case the gas generator is arranged in the gas bag main chamber or protrudes into the same, the gas generator preferably is attached to the left or right side of the backrest as far as possible to the front as seen in the direction of travel. This arrangement can promote the lever effect described below.

In the inflated condition, the gas bag main chamber can extend in a plane that is aligned substantially parallel to the direction of travel or mostly is aligned along the direction of travel. In the inflated condition, the gas bag main chamber can have a larger expansion along the direction of travel than the gas bag secondary chamber. In particular, in the inflated condition the gas bag main chamber can protrude beyond the gas bag secondary chamber and the backrest in the direction of travel. Expressed in other words, the gas bag secondary chamber (as seen in the direction of travel) is arranged in the rear region of the gas bag main chamber. The gas bag layers forming the gas bag main chamber and the gas bag secondary chamber can be cut to size such that in the non-inflated condition spread out flat the gas bag layer(s) of the gas bag main chamber has/have a larger surface area than the gas bag layer(s) of the gas bag secondary chamber. In particular, the gas bag layer(s) of the gas bag main chamber can have a larger expansion in one direction than the gas bag layer(s) of the gas bag secondary chamber in the same direction. In the properly arranged condition of the gas bag main chamber and the gas bag secondary chamber, this direction corresponds to the direction of travel.

In particular, it can be provided that the gas bag main chamber is attached to the backrest in front of the gas bag secondary chamber as seen in the direction of travel. In particular, the gas bag main chamber can be attached to an edge of the backrest that is defined by the front side and the left or right side of the backrest. The attachment can be of point-like design. The gas bag main chamber can be attached to the backrest via a gas generator or by clips at this point of attachment. Due to the fact that the point of attachment of the gas bag main chamber to the backrest (as seen in the direction of travel) lies in front of the gas bag secondary chamber, while the gas bag secondary chamber is disposed between the gas bag main chamber and the backrest, the gas bag main chamber in the inflated condition is rotated with respect to the direction of travel by an angle without the action of a lateral force by an impacting occupant, wherein the point of rotation is defined by the point of attachment of the gas bag main chamber to the backrest. As compared to the direction of travel, the rear portion of the gas bag main chamber as seen in the direction of travel concretely is turned away from the backrest, while the front portion of the gas bag main chamber as seen in the direction of travel is turned towards the backrest. The front portion of the gas bag main chamber accordingly is turned towards an occupant sitting on the vehicle seat to which the backrest belongs. In the event of a lateral impact of the occupant on the gas bag main chamber (or on its front portion), the same rotates about the point of attachment (point of rotation) of the gas bag main chamber on the backrest by reducing the angle between the gas bag main chamber and the direction of travel. This rotation becomes possible by arranging the gas bag secondary chamber, whose volume can be reduced on twisting of the gas bag main chamber, in the direction of travel behind the point of attachment. Instead of breaking away as otherwise usual, merely a slight rotation hence takes place. By twisting, the gas bag main chamber offers a higher supporting force, which acts against the impacting occupant. The restraint effect thus can be improved.

Due to the gas bag secondary chamber the gas bag main chamber acts like a lever. Preferably, the portion of the gas bag main chamber that is disposed in front of the point of attachment of the gas bag main chamber to the backrest as seen in the direction of travel is greater than the portion of the gas bag main chamber that is disposed behind the point of attachment of the gas bag main chamber to the backrest as seen in the direction of travel. Due to the size ratio of the front portion of the gas bag main chamber to the rear portion of the gas bag main chamber, the lever effect of the gas bag main chamber can be influenced. The lever effect of the gas bag main chamber can also be influenced by the extent of the expansion of the gas bag secondary chamber in the inflated condition transversely to the direction of travel.

According to another embodiment the gas bag main chamber can be laterally (left side or right side) supported at the backrest, while the gas bag secondary chamber is supported on the rear side of the backrest. The gas bag main chamber can be attached to the left or right side of the backrest and the gas bag secondary chamber can be attached to the rear side of the backrest.

The solution also relates to an airbag module that is suitable for the above-described vehicle occupant restraint system. Accordingly, the airbag module includes an inflatable gas bag main chamber and an inflatable gas bag secondary chamber, wherein in the inflated condition the gas bag main chamber has a larger volume than the gas bag secondary chamber and wherein the gas bag main chamber and the gas bag secondary chamber are fluidically connected to each other via an overflow opening. The gas bag main chamber and the gas bag secondary chamber are shaped such that they can be arranged on a backrest of a vehicle seat such that in the inflated condition the gas bag secondary chamber is supported at the backrest of the vehicle seat. The airbag module furthermore can include all features of that airbag module which has been described as part of the vehicle occupant restraint system.

The solution relates to a further airbag module for a vehicle occupant restraint system. The airbag module can be arranged laterally on a backrest of a vehicle seat of the vehicle occupant restraint system and comprises an inflatable gas bag main chamber and at least one inflatable gas bag secondary chamber. In the inflated condition, the gas bag main chamber has a larger volume than the at least one gas bag secondary chamber. The gas bag main chamber and the at least one gas bag secondary chamber are fluidically connected to each other via an overflow opening. Thus, with only one gas generator the gas bag main chamber and the at least one gas bag secondary chamber can be filled with a gas. In the inflated condition, the at least one gas bag secondary chamber is of substantially tubular design and rests against a side of the gas bag main chamber. Thus, the at least one gas bag secondary chamber can serve as a rib-like reinforcement of the gas bag main chamber and counteract breaking away of the gas bag main chamber. The at least one gas bag secondary chamber can rest against the side of the gas bag main chamber that properly faces away from the backrest. When the airbag module is properly arranged laterally on a backrest, the inflated gas bag main chamber extends laterally beside the vehicle seat in a plane that is aligned substantially parallel to the direction of travel. The longitudinal axis of the at least one gas bag secondary chamber can be aligned substantially along the direction of travel. Furthermore, it is conceivable that the longitudinal axis of the at least one gas bag secondary chamber is aligned substantially perpendicular to the direction of travel or at an angle other than substantially 90° to the direction of travel. There can also be provided a plurality of tubular gas bag secondary chambers, which each are arranged at a distance to each other. The tubular gas bag secondary chambers can be arranged substantially parallel to each other.

BRIEF DESCRIPTION OF THE DRAWINGS

The solution will be explained in detail below by means of exemplary embodiments with reference to the Figures.

DETAILED DESCRIPTION

Figure 1:
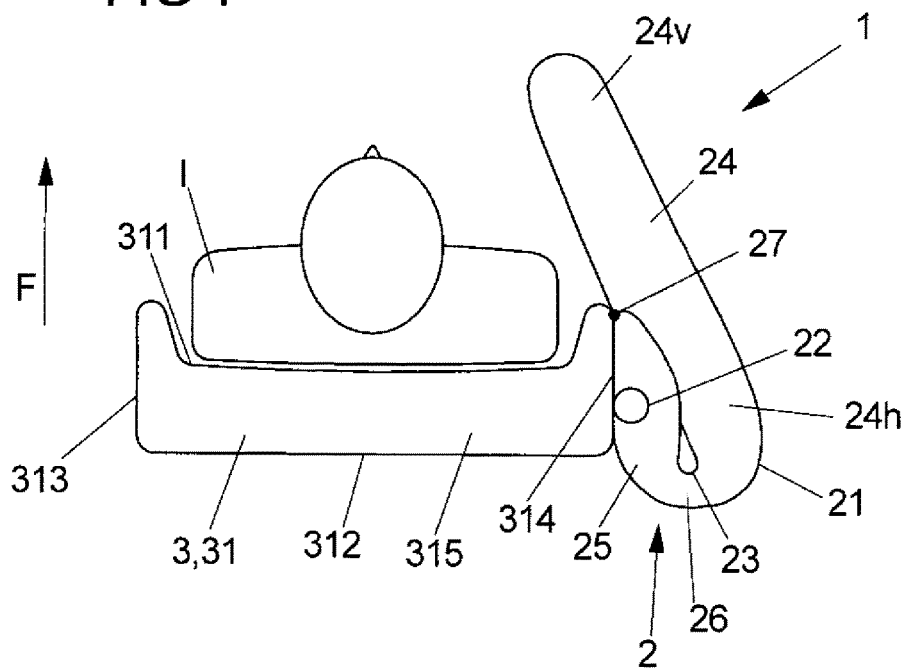
FIG. 1 shows a top view of a vehicle occupant restraint system according to an embodiment.
Figure 2:
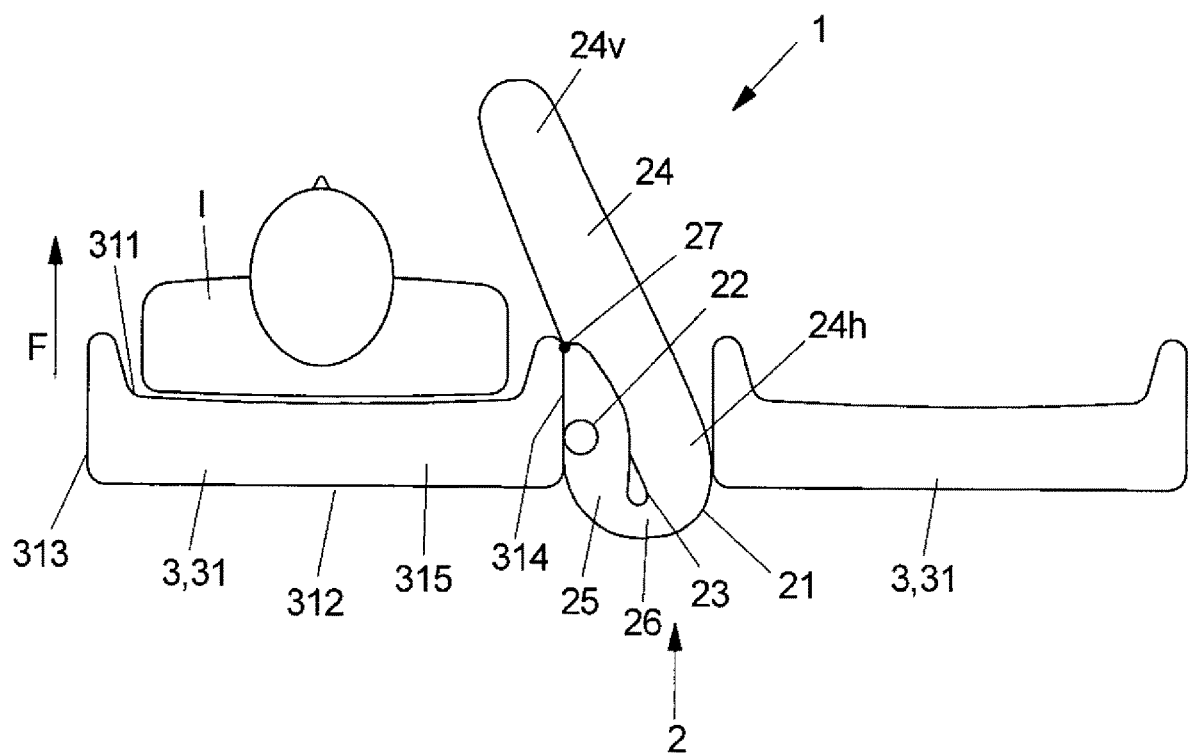
FIG. 2 shows a top view of the vehicle occupant restraint system of FIG. 1 with an additional adjacent backrest.

FIGS. 1 and 2 show a vehicle occupant restraint system according to an embodiment each in a top view. The vehicle occupant restraint system is designated with the reference numeral 1. The vehicle occupant restraint system 1 comprises an airbag module 2 and a backrest 31, which are attached to each other. The backrest 31, which is provided to support the back of a vehicle occupant I, is part of a vehicle seat 3. In the properly arranged condition of the vehicle seat 3 in a vehicle, the backrest 31 extends substantially vertically and perpendicularly to the direction of travel, which in FIG. 1 is designated with the arrow F. The backrest 31 includes a front side 311, a rear side 312 opposite the front side 311, a left side 313 and a right side 314, and an upper side 315. The front side 311 is the side that is available for the vehicle occupant I to lean on. In the condition of the vehicle seat 3 properly arranged in the vehicle the front and the rear side 311, 312 extend substantially perpendicularly to the direction of travel F. The left side 313 is disposed opposite the right side 314, wherein both sides 313, 314 extend vertically between the front side 311 and the rear side 312 and substantially perpendicularly to the same. The upper side 315 extends substantially horizontally between the front side 311 and the rear side 312 and substantially perpendicular to the same.

The airbag module 2 comprises an inflatable gas bag 21 and a gas generator 22 which in the case of activation provides a gas for filling the gas bag 21. The gas bag 21 is turned over by forming a fold 23. The gas bag 21 encloses a gas bag main chamber 24 and a gas bag secondary chamber 25. The gas bag main chamber 24 and the gas bag secondary chamber 25 are arranged on either side of the fold 23. In the region of the fold 23, the gas bag main chamber 24 and the gas bag secondary chamber 25 are fluidically connected to each other by means of an overflow opening 26. In the condition of the gas bag 21 properly arranged at the backrest 31, the fold 23 is formed in the rear region of the gas bag 21 as seen in the direction of travel F. The gas bag secondary chamber 25 has a smaller volume and as seen along the direction of travel F also a smaller expansion than the gas bag main chamber 24. The gas generator 22 protrudes into the gas bag secondary chamber 25 from below. Via the gas generator 22 the gas bag secondary chamber 25 is attached to the right side 314 of the backrest 31. The gas generated by the gas generator 22 flows through the overflow opening 26 from the gas bag secondary chamber 25 also into the gas bag main chamber 24. In the inflated condition, the gas bag secondary chamber 25 is supported at the right side 314 of the backrest 31. The gas bag main chamber 24 has a front portion 24v as seen in the direction of travel and a rear portion 24h as seen in the direction of travel, which faces the front portion 24v. The gas bag main chamber 24 is supported on the gas bag secondary chamber 25 with its rear portion 24h, while the front portion 24v of the gas bag main chamber 24 is free-standing. The gas bag main chamber 24 is attached to the right side 314 of the backrest 31 at a point 27, wherein the point 27 is located in front of the gas bag secondary chamber 25 as seen in the direction of travel F. Due to the point of attachment 27 and the gas bag secondary chamber 25 located therebehind as seen in the direction of travel, the alignment of the inflated gas bag main chamber 24 (without the action of an external force by an impacting occupant) with respect to the direction of travel F is twisted, namely the front portion 24v of the gas bag main chamber 24 is rotated towards the backrest 31, while the rear portion 24h of the gas bag main chamber 24 is rotated away from the backrest 31.

In the region of the backrest 31 the expansion of the gas bag 21 transversely to the direction of travel F is relatively large due to the superposition of the gas bag secondary chamber 25 and the rear portion 24h of the gas bag main chamber 24. Due to the large expansion, the gas bag main chamber 24 can be supported at the backrest 31 of an adjacent vehicle seat 3 with its rear portion 24h (FIG. 2).

Figure 3:
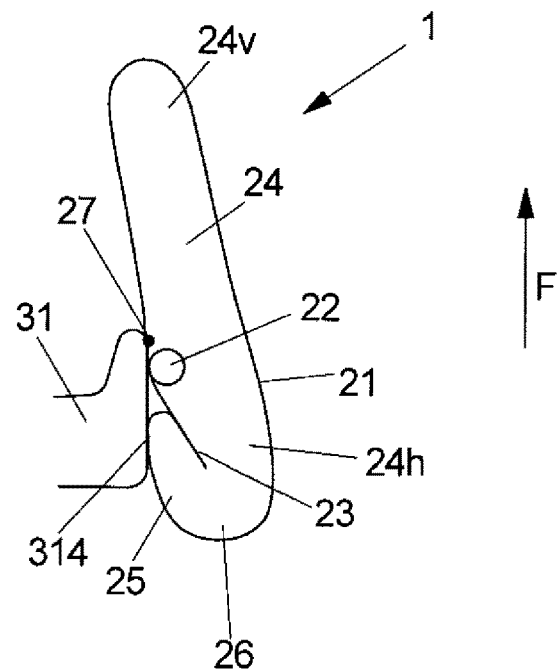
FIG. 3 shows a top view of a vehicle occupant restraint system according to another embodiment.

The embodiment of FIG. 3 differs from the one of FIGS. 1 and 2 in particular in that the gas generator 22 protrudes into the gas bag main chamber 24, not into the gas bag secondary chamber 25. The gas generator 22 is provided between the point of attachment 27 (of the gas bag main chamber 24 to the backrest 31) and the gas bag secondary chamber 25 as seen in the direction of travel F. The gas generator 22 is attached to the right side 314 of the backrest 31. Via the gas generator 22 the gas bag main chamber 24 can be attached to the backrest 31 in addition to the point of attachment 27. According to an alternative, the gas bag main chamber 24 can be attached to the backrest 31 only via the gas generator 22, in case the gas generator 22 is arranged in front of the gas bag secondary chamber 25 in the direction of travel. Then, the point of attachment 27 (for example realized by clips) can be omitted.

Figure 4:
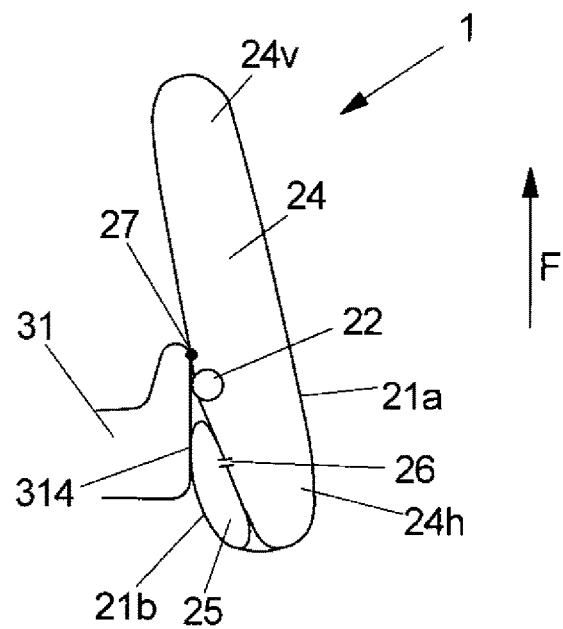
FIG. 4 shows a top view of a vehicle occupant restraint system according to another embodiment.

The embodiment of FIG. 4 differs from the one of FIG. 3 in particular in that the gas bag main chamber 24 and the gas bag secondary chamber 25 are formed by one gas bag 21a, 21b each, and not one gas bag is folded. The gas bag 21b forming the gas bag secondary chamber 25 with one gas bag layer rests against a gas bag layer of the gas bag 21a forming the gas bag main chamber 24. In the gas bag layers of the two gas bags 21a, 21b resting against each other one opening each is formed. The openings lie one on top of the other and together form the overflow opening 26. To avoid slipping of the two openings relative to each other, the gas bag layers of the two gas bags 21a, 21b resting against each other are locally attached to each other. In the embodiment of FIG. 4, the gas generator 22 protrudes into the gas bag main chamber 24. Alternatively, the gas generator 22 can protrude into the gas bag secondary chamber 25. Furthermore, in FIG. 4 the gas bag main chamber 24 is attached to the backrest 31 via the gas generator 22 and the point of attachment 27. Alternatively, the gas bag main chamber 24 can be attached to the backrest 31 only via the gas generator 22 or only via the point of attachment 27.

Figure 5:
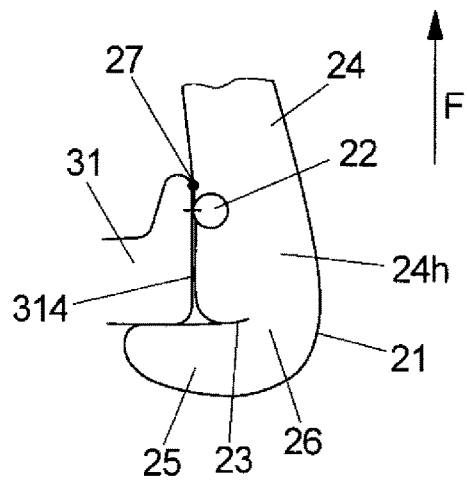
FIG. 5 shows a top view of a vehicle occupant restraint system according to another embodiment.
Figure 6:
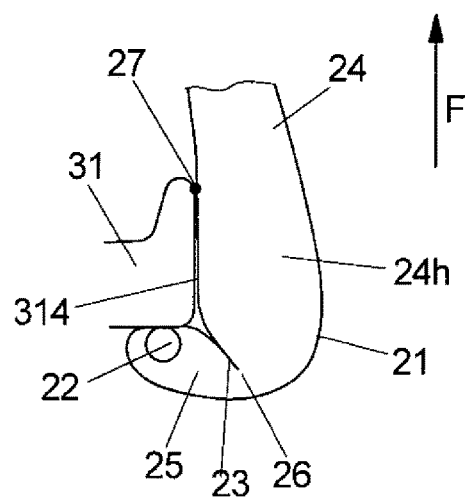
FIG. 6 shows a top view of a vehicle occupant restraint system according to another embodiment.

The embodiments of FIGS. 5 and 6 differ from those of FIGS. 1 to 4 in particular in that the gas bag secondary chamber 25 is supported on the rear side 312 of the backrest 31, not on the right side 314. The gas bag main chamber 24 is supported on the right side 314 of the backrest 31. The gas bag main chamber 24 and the gas bag secondary chamber 25 are formed by one gas bag 21, which is folded about the edge that is formed by the right side 314 and the rear side 312 of the backrest 31. Alternatively, the gas bag main chamber 24 and the gas bag secondary chamber 25 can be formed by two individual gas bags, similar to the embodiment of FIG. 4. In the embodiment of FIG. 5, the gas generator 22 protrudes into the gas bag main chamber 24, while in the embodiment of FIG. 6, the gas generator 22 protrudes into the gas bag secondary chamber 25. In FIG. 5, the gas generator 22 is arranged in the front region of the right side 314 of the backrest 31 as seen in the direction of travel. Alternatively, the gas generator 22 can be arranged in the rear region of the right side 314 of the backrest 31, close to the fold 23, as seen in the direction of travel. The gas generator 22 each can serve for the attachment of the gas bag main chamber 24 and/or gas bag secondary chamber 25. The respective other gas bag chamber can be attached to the backrest 31 for example by clips.

Figure 7:
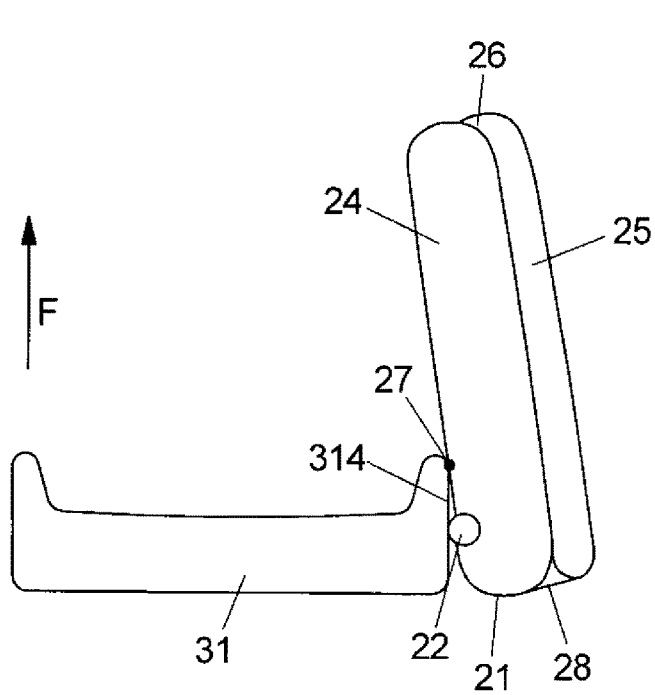
FIG. 7 shows a top view of a vehicle occupant restraint system according to another embodiment.
Figure 8:
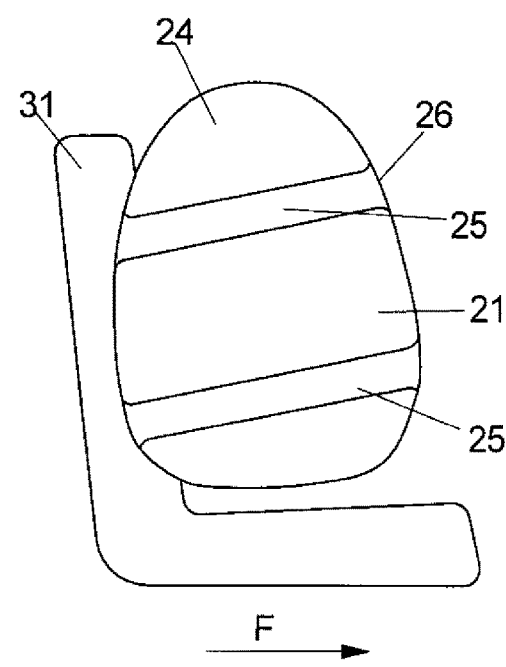
FIG. 8 shows a side view of the vehicle occupant restraint system of FIG. 7.

FIGS. 7 and 8 show two different views of an airbag module 2 that is laterally attached to a backrest 31 of a vehicle seat 3. The airbag module 2 comprises a gas bag main chamber 24 and two gas bag secondary chambers 25, which are fluidically connected to each other. The number of the gas bag secondary chambers 25 here is only exemplary and can differ from two. The gas bag main chamber 24 has a larger volume than each individual gas bag secondary chamber 25. In the inflated condition, the gas bag secondary chambers 25 are of tubular design and arranged on one side of the gas bag main chamber 24. The gas bag secondary chambers 25 serve as rib-like reinforcement of the gas bag main chamber 24 and thus reduce the risk that the gas bag main chamber 24 breaks away due to a laterally impinging occupant and thus cannot sufficiently catch the occupant. The gas bag secondary chambers 25 are arranged substantially parallel to each other. The gas bag main chamber 24 extends in a plane beside the backrest 31, which is directed substantially in the direction of travel F. On the side of the gas bag main chamber 24 facing away from the backrest 31, the gas bag secondary chambers 25 are arranged and are supported at the gas bag main chamber 24. Alternatively, they can be arranged on the side of the gas bag main chamber 24 facing the backrest 31. The longitudinal axes of the tubular gas bag secondary chambers 25 extend substantially horizontally along the direction of travel F. The expansion of the gas bag secondary chambers 25 along the direction of travel F substantially corresponds to the expansion of the gas bag main chamber 24 along the direction of travel F in the corresponding region. Alternatively, the longitudinal axes of the tubular gas bag secondary chambers 25 can extend substantially vertically, i.e. perpendicularly to the direction of travel F, or at another angle to the direction of travel F. The gas generator 22 protrudes into the gas bag main chamber 24. Via the gas generator 22 the gas bag main chamber 24 can be attached to the backrest 31. The gas bag main chamber 24 and the gas bag secondary chambers 25 here are formed by folding over a gas bag 21. The folded configuration is fixed by a catch strap 28. Alternatively, the gas bag secondary chambers 25 can be attached to the gas bag main chamber 24 via a seam in order to fix the folded configuration. Instead of a folded gas bag 21, the gas bag main chamber 24 and the gas bag secondary chambers 25 can each be formed by a gas bag.

Figure 9:
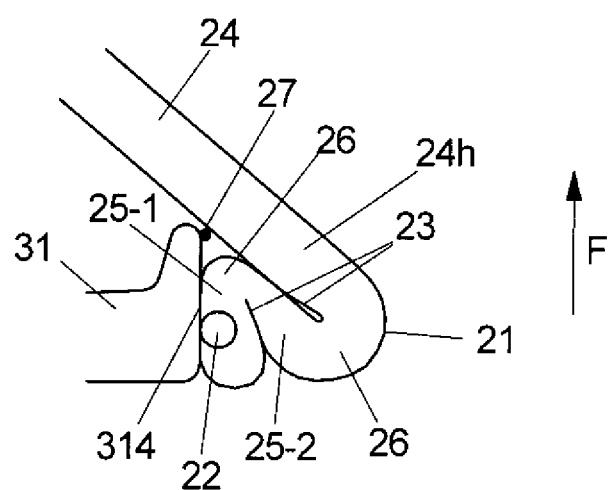
FIG. 9 shows a top view of a vehicle occupant restraint system according to another embodiment.

FIG. 9 shows another embodiment of the vehicle occupant restraint system 1, which in particular differs from the one of FIGS. 1 and 2 in that two gas bag secondary chambers 25-1, 25-2 are provided. In the inflated condition, the first gas bag secondary chamber 25-1 is supported on the right side 314 (alternatively on the left side 313) of the backrest 31, while the second gas bag secondary chamber 25-2 is arranged between the first gas bag secondary chamber 25-1 and the gas bag main chamber 24, in particular the rear portion 24h of the gas bag main chamber 24. The second gas bag secondary chamber 25-2 is supported on the first gas bag secondary chamber 25-1. With its rear portion 24h, the gas bag main chamber 24 is supported on the second gas bag secondary chamber 25-2. The gas bag 21 forming the chambers is turned over in a meandrous or S-shaped manner by forming two folds 23, wherein between the first gas bag secondary chamber 25-1 and the second gas bag secondary chamber 25-2 and between the second gas bag secondary chamber 25-2 and the gas bag main chamber 24 one fold 23 each is formed. Via overflow openings 26 in the region of the folds 23 the first gas bag secondary chamber 25-1, the second gas bag secondary chamber 25-2 and the gas bag main chamber 24 are fluidically connected to each other. Instead of a meandrous convolution, the gas bag 21 can also be wound/folded spirally. Instead of a folded gas bag, one gas bag each can be provided to form the gas bag secondary chambers 25-1, 25-2 and the gas bag main chamber 24, which are fluidically connected to each other via corresponding overflow openings 26. To allow a defined alignment of the gas bag secondary chambers 25-1, 25-2 and the gas bag main chamber 24 relative to each other in the inflated condition, a connecting means for example in the form of a catch strap or a connecting seam is provided. Via the gas generator 22 the first gas bag secondary chamber 25-1 is attached in the rear region of the right side 314 of the backrest 31 (as seen in the direction of travel F). The gas bag main chamber 24 is attached to the right side 314 of the backrest 31 at a point of attachment 27, wherein the point 27 is located in front of the gas bag secondary chambers 25-1, 25-2 as seen in the direction of travel F, in particular in the front region (as seen in the direction of travel F) of the right side 314 of the backrest 31. Due to the connecting means between the gas bag secondary chambers 25-1, 25-2 and the gas bag main chamber 24, an attachment of the second gas bag secondary chamber 25-2 to the backrest 31 is not absolutely necessary. It can, however, be provided that the second gas bag secondary chamber 25-2 likewise is attached to the backrest 31 at (or close to) the point of attachment 27. The gas bag secondary chambers 25-1, 25-2 substantially have the same volume and in the direction of travel F substantially the same expansion. On the other hand, the volume and the expansion in the direction of travel F of the gas bag main chamber 24 are greater than the volume and the expansion in the direction of travel F of each gas bag secondary chamber 25-1, 25-2.

The embodiment of FIG. 9 shows a vehicle occupant restraint system 1 with two gas bag secondary chambers 25-1, 25-2. However, more than two gas bag secondary chambers can also be provided, which are arranged corresponding to the embodiment of FIG. 9.

In all embodiments of FIGS. 1 to 9, the gas bag 21 by way of example is arranged on the right side 314 of the backrest 31. Alternatively, the gas bag 21 can be arranged on the left side 313 of the backrest 31. In addition, in all embodiments the gas bag main chamber 24 is attached to an edge of the backrest 31 that is defined by the front side 311 and the right or left side 314, 313 of the backrest 31. However, the gas bag main chamber 24 can also be attached to the right or left side 314, 313 of the backrest 31 close to this edge. The attachment in particular is effected via a point of attachment 27. Moreover, a plurality of points of attachment can be provided, which are (uniformly) distributed along the vertical expansion of the backrest. In all embodiments, the gas generator 22 is arranged on an outer side (i.e. a side facing away from the occupant) of a frame of the backrest 31. In particular for the embodiment of FIG. 6, the gas generator on the rear side 312 can alternatively be arranged on (or close to) an inner side (i.e. a side facing the occupant) of the frame of the backrest 31. But also for the remaining embodiments, the gas generator 22 can be arranged on the left or right side 313, 314 of the backrest 31 on (or close to) the inside of the frame.

The invention claimed is:

1. A vehicle occupant restraint system comprising an airbag module and a backrest of a vehicle seat, wherein the airbag module is arranged at the backrest, and wherein the airbag module comprises an inflatable gas bag main chamber and an inflatable gas bag secondary chamber, wherein in the inflated condition the gas bag main chamber has a larger volume than the gas bag secondary chamber and wherein the gas bag main chamber and the gas bag secondary chamber are fluidically connected to each other via an overflow opening, wherein the airbag module is arranged at the backrest of the vehicle seat in such a way that in the inflated condition the gas bag secondary chamber is supported at the backrest of the vehicle seat, wherein in the inflated condition the gas bag main chamber is supported on a side of the gas bag secondary chamber that faces away from the backrest so that the gas bag secondary chamber is arranged between the gas bag main chamber and the backrest.

2. The vehicle occupant restraint system according to claim 1, wherein the gas bag main chamber is attached to the backrest at a point of attachment, wherein the point of attachment is provided at or close to an edge of the backrest that is defined by a front side of the backrest and a left or right side of the backrest.

3. The vehicle occupant restraint system according to claim 1, wherein the gas bag main chamber and the gas bag secondary chamber are formed by a folded inflatable gas bag, wherein the gas bag main chamber and the gas bag secondary chamber are configured on either side of the fold thus formed, or that the gas bag main chamber and the gas bag secondary chamber are formed by one inflatable gas bag each.

4. The vehicle occupant restraint system according to claim 3, wherein the gas bag that forms the gas bag main chamber and the gas bag that forms the gas bag secondary chamber each include an opening, wherein the two openings are fluidically connected to each other.

5. The vehicle occupant restraint system according to claim 1, wherein the gas bag main chamber and the gas bag secondary chamber are connected to each other by a connector so that in the inflated condition the gas bag main chamber and the gas bag secondary chamber have a defined alignment relative to each other.

6. The vehicle occupant restraint system according to claim 1, wherein the airbag module comprises a gas generator that is arranged in the gas bag main chamber or in the gas bag secondary chamber or that protrudes into the gas bag main chamber or into the gas bag secondary chamber.

7. The vehicle occupant restraint system according to claim 1, wherein the airbag module is arranged laterally on the backrest.

8. The vehicle occupant restraint system according to claim 7, wherein the airbag module faces a vehicle interior space and faces away from a vehicle door.

9. The vehicle occupant restraint system according to claim 1, wherein the gas bag secondary chamber is laterally supported on the backrest.

10. The vehicle occupant restraint system according to claim 1, wherein in the inflated condition the gas bag main chamber has a larger expansion along the direction of travel than the gas bag secondary chamber.

11. The vehicle occupant restraint system according to claim 1, wherein in the inflated condition the gas bag main chamber protrudes beyond the gas bag secondary chamber and the backrest in the direction of travel.

12. The vehicle occupant restraint system according to claim 1, wherein the gas bag main chamber is attached to the backrest in front of the gas bag secondary chamber in the direction of travel.

13. The vehicle occupant restraint system according to claim 12, wherein the gas bag main chamber is attached to the backrest at a point of attachment and in the inflated condition is rotatable about this point of attachment.

14. The vehicle occupant restraint system according to claim 1, wherein the gas bag main chamber is laterally supported on the backrest, while the gas bag secondary chamber is supported on a rear side of the backrest.

15. A vehicle occupant restraint system comprising an airbag module and a backrest of a vehicle seat, wherein the airbag module is arranged at the backrest, and wherein the airbag module comprises an inflatable gas bag main chamber and an inflatable gas bag secondary chamber, wherein in the inflated condition the gas bag main chamber has a larger volume than the gas bag secondary chamber and wherein the gas bag main chamber and the gas bag secondary chamber are fluidically connected to each other via an overflow opening, wherein the airbag module is arranged at the backrest of the vehicle seat in such a way that in the inflated condition the gas bag secondary chamber is supported at the backrest of the vehicle seat, wherein the airbag module comprises at least two gas bag secondary chambers, wherein in the inflated condition a first gas bag secondary chamber of the at least two gas bag secondary chambers is supported on the backrest of the vehicle seat and in the inflated condition the gas bag main chamber is supported on a second gas bag secondary chamber of the at least two gas bag secondary chambers, which is arranged between the first gas bag secondary chamber and the gas bag main chamber.

16. The vehicle occupant restraint system according to claim 15, wherein the gas bag main chamber is attached to the backrest in front of the at least two gas bag secondary chambers in the direction of travel, wherein in particular the gas bag main chamber is attached to the backrest at a point of attachment and in the inflated condition is rotatable about this point of attachment.

* * * * *